(12) United States Patent
Hershkowitz et al.

(10) Patent No.: US 7,815,892 B2
(45) Date of Patent: Oct. 19, 2010

(54) INTEGRATION OF HYDROGEN AND POWER GENERATION USING PRESSURE SWING REFORMING

(75) Inventors: Frank Hershkowitz, Liberty Corner, NJ (US); Harry W. Deckman, Clinton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 1102 days.

(21) Appl. No.: 10/912,820

(22) Filed: Aug. 6, 2004

(65) Prior Publication Data

US 2005/0201929 A1 Sep. 15, 2005

Related U.S. Application Data

(63) Continuation-in-part of application No. 10/771,919, filed on Feb. 4, 2004, which is a continuation-in-part of application No. 10/756,652, filed on Jan. 13, 2004, now abandoned.

(60) Provisional application No. 60/450,903, filed on Feb. 28, 2003.

(51) Int. Cl.
C01B 3/02 (2006.01)
C01B 3/24 (2006.01)
C01B 3/26 (2006.01)

(52) U.S. Cl. ............... 423/652; 423/651; 423/650; 423/648.1

(58) Field of Classification Search ....... 423/648.1–652
See application file for complete search history.

(56) References Cited

U.S. PATENT DOCUMENTS

| 2,556,835 | A | * | 6/1951 | Barr ................... 48/198.1 |
| 5,763,114 | A | * | 6/1998 | Khandkar et al. ......... 429/20 |
| 5,897,686 | A | * | 4/1999 | Golden et al. ............ 95/99 |
| 6,113,874 | A | | 9/2000 | Kobayashi ............. 423/650 |
| 6,210,157 | B1 | | 4/2001 | Kobayashi ............. 432/181 |
| 6,299,994 | B1 | * | 10/2001 | Towler et al. .......... 429/17 |
| 6,338,239 | B1 | * | 1/2002 | Hirata et al. ........... 60/775 |
| 6,767,530 | B2 | * | 7/2004 | Kobayashi et al. ...... 423/650 |
| 6,969,506 | B2 | * | 11/2005 | Tonkovich et al. ...... 423/652 |
| 2003/0113257 | A1 | | 6/2003 | Kobayashi et al. ...... 423/652 |
| 2004/0170559 | A1 | * | 9/2004 | Hershkowitz et al. .... 423/652 |
| 2004/0191166 | A1 | * | 9/2004 | Hershkowitz et al. .... 423/652 |
| 2005/0201929 | A1 | * | 9/2005 | Hershkowitz et al. .... 423/652 |

OTHER PUBLICATIONS

Kikuchi, E. Membrane reactor application to hydrogen production. Catalysis Today 56 (2000) 97-101.*

* cited by examiner

*Primary Examiner*—Jerry Lorengo
*Assistant Examiner*—Jennifer A Smith
(74) *Attorney, Agent, or Firm*—Paul E. Purwin

(57) ABSTRACT

The invention provides a method for generating power with a gas turbine which utilizes pressure swing reforming under conditions that facilitate $CO_2$ capture. First a synthesis gas stream at a first pressure is produced in a pressure swing reformer. Next the synthesis gas stream is subjected to a high temperature water gas shift process to produce a $CO_2$ containing hydrogen enriched stream from which hydrogen and $CO_2$ each are separated. The separated hydrogen in turn is combusted with air to produce a gas turbine and the separated $CO_2$ is easily sequestered.

9 Claims, 3 Drawing Sheets

INTEGRATION OF HYDROGEN AND POWER GENERATION USING PRESSURE SWING REFORMING

This application is a Continuation-in-Part of U.S. patent application Ser. No. 10/771,919 filed Feb. 4, 2004 which is a Continuation-in-Part of Non-Provisional application Ser. No. 10/756,652 filed Jan. 13, 2004 now abandoned which is based on Provisional Application No. 60/450,903 filed Feb. 28, 2003.

FIELD OF INVENTION

The present invention relates to a method for generating power with a gas turbine which utilizes pressure swing reforming under conditions that facilitate $CO_2$ capture.

BACKGROUND OF INVENTION

Pressure swing reforming is a highly efficient and highly productive process for stream reforming hydrocarbons in a cyclic, packed-bed operation to produce synthesis gas.

In this process, the reforming stage involves preheating a first zone to a temperature in the range of about 700° C. to 2000° C. and then introducing a 20° C. to 600° C. hydrocarbon-containing feed, along with steam and optionally $CO_2$ to the inlet of the first zone. Upon introduction of the reactants, the hydrocarbon is reformed into synthesis gas over a catalyst in this first zone. The synthesis gas is then passed from the first zone to a second zone, where the gas is cooled to a temperature close to the inlet temperature of the hydrocarbon feed. The synthesis gas is recovered as it exits the inlet of the second zone.

The regeneration stage begins when a gas is introduced to the inlet of the second zone. This gas is heated by the stored heat of the second zone to the high temperature of the zone and carries the heat back into the first zone. Finally, an oxygen-containing gas and fuel are combusted near the interface of the two zones, producing a hot flue gas that travels across the first zone, thus re-heating that zone to a temperature high enough to reform the feed. Once heat regeneration is completed, the cycle is completed and reforming begins again.

An advantage of this process is the ability to operate the reforming stage at a higher pressure than the regeneration stage, thus creating a pressure swing, and producing high pressure synthesis gas.

The general stoichiometry for the steam reforming of a hydrocarbon, as illustrated for methane, is:

$$CH_4 + H_2O \rightarrow CO + 3H_2 \quad (1)$$

In copending U.S. patent application Ser. No. 10/771,919 a process is provided for generating hydrogen at improved thermal efficiencies and that is particularly adaptable for environments requiring hydrogen at relatively high pressures for refinery processes, for direct use as a fuel and for distribution. The inventive process integrates pressure swing reforming in which synthesis gas is produced with the water gas shift reaction and hydrogen separation under conditions sufficient to yield high pressure hydrogen at improved thermal efficiencies.

The general stoichiometry for the water gas shift reaction is:

$$CO + H_2O \rightarrow CO_2 + H_2 \quad (2)$$

In the disclosed process the reforming phase of the pressure swing reforming is conducted at relatively high pressures, for example, from about 10 to 100 bar and the product synthesis gas is subjected to a water gas shift reaction and a hydrogen separation step at substantially the same pressures thereby providing high pressure hydrogen. In one embodiment flue gas from the pressure swing regeneration stage is used to power a gas turbine for power and steam generation.

It is an object of the present invention to generate power with a gas turbine, which utilizes pressure swing reforming under conditions that facilitate $CO_2$ capture. The capture of the $CO_2$-product of fuel combustion in power generation is of interest for the recovery of $CO_2$ for use as chemical feedstock, as agent of enhanced oil production, and for the purpose of sequestration, the disposal of $CO_2$ for purposes of mitigating the climate impact of fossil fuel use. It also is an object of the present invention to provide a means to achieve power production with $CO_2$ capture that under conditions that result in a minimum loss of power production efficiency. Present technologies known in the art for $CO_2$ capture in power generation are both expensive and inefficient. For example, separating $CO_2$ from the dilute fluegas of a power plant has an efficiency loss reflected in a fuel penalty greater than 16% (i.e. requires 16% more fuel for same power output); separating $CO_2$ from the concentrated syngas in a coal gasification combined cycle power plant carries a fuel penalty over 14%. Combining conventional steam reforming, partial oxidation or autothermal reforming with gas turbine power generation can result in a fuel penalty of 20% or more.

Another object of the present invention is to maximize one of power or hydrogen production under conditions that facilitate $CO_2$ capture.

Other objects of the invention will become apparent upon a reading of the detailed description of the invention which follows:

SUMMARY OF THE INVENTION

In the present invention electric power is generated by combusting hydrogen and air to power a gas turbine. The hydrogen used in the combustion step is generated by integrating pressure swing reforming, in which synthesis gas is produced, with a water gas shift reaction and subsequent separation of the hydrogen and $CO_2$. By operating the reforming stage of the pressure swing reforming process at relatively high pressures the product synthesis gas is subject to a water gas shift reaction and separation step at substantially the same pressures thereby providing separate streams of high pressure hydrogen and $CO_2$ thereby facilitating the capture of the $CO_2$.

DETAILED DESCRIPTION

Figure 1A:
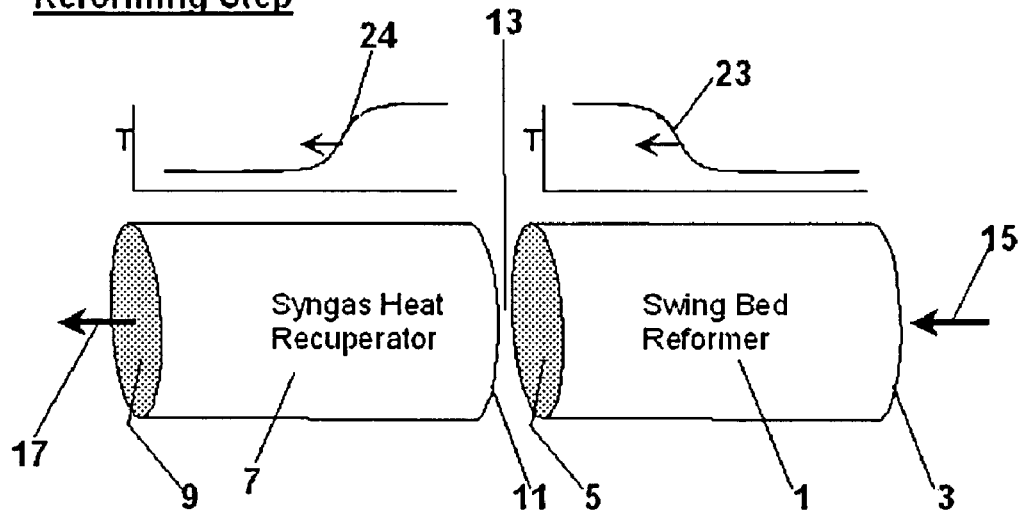
FIGS. 1a and 1b are schematic illustrations showing the basic reforming and regeneration stages of pressure swing reforming.
Figure 1B:
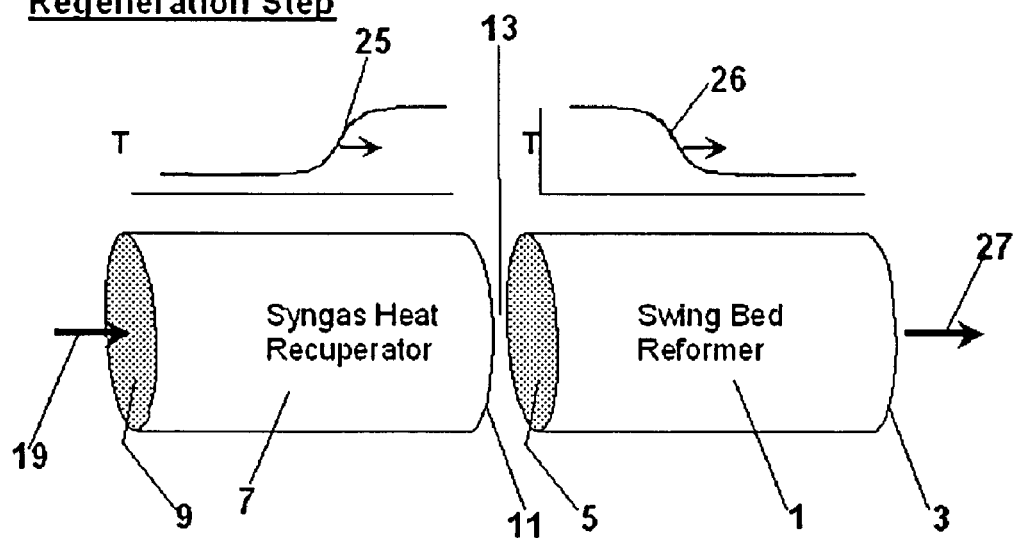

To facilitate understanding of the present invention reference is made first to FIGS. 1a and 1b which diagrammatically illustrate the basic two step cycle of pressure swing reforming.

Referring now to FIGS. 1a and 1b, a first zone, or reforming zone (1), called a swing bed reformer, and a second zone, or recuperating zone, called a synthesis gas heat recuperator (7). The beds of both zones will include packing material, while the reforming bed (1) will include catalyst for steam reforming. Though illustrated as separate reforming and recuperating zones, it is to be recognized that the pressure swing reforming apparatus may comprise a single reactor.

As shown in FIG. 1a, at the beginning of the first step of the cycle, also called the reforming stage, the reforming zone (1) is at an elevated temperature and the recuperating zone (7) is at a lower temperature than the reforming zone (1). A hydrocarbon-containing feed along with steam is introduced via a conduit (15), into a first end (3) of the reforming zone (1). The hydrocarbon may be any material that undergoes the endothermic steam reforming reaction including methane, petroleum gases, petroleum distillates, kerosene, jet fuel, fuel oil, heating oil, diesel fuel and gas oil and gasoline, oxygenates, alcohols and ethanol. Preferably the hydrocarbon will be a gaseous material or one which will rapidly become substantially gaseous upon introduction into the reforming zone (1). Preferably, the steam will be present in proportion to the hydrocarbon in an amount that results in a steam to carbon ratio between about 1 and about 3 (considering only carbon in the hydrocarbon, not carbon in CO or $CO_2$ species that may be present). The hydrocarbon-containing feed may also contain $CO_2$, synthesis gas species (e.g. CO, $H_2$), diluents (e.g. $N_2$, Ar, He), as well as contaminants such as $H_2S$.

This feed stream picks up heat from the bed and is converted over the catalyst and heat to synthesis gas. As this step proceeds, a temperature profile (23) is created based on the heat transfer properties of the system. When the bed is designed with adequate heat transfer capability, as described herein, this profile has a relatively sharp temperature gradient, which gradient will move across the reforming zone (1) as the step proceeds.

Synthesis gas exits the reforming bed (1) through a second end (5) at an elevated temperature and passes through the recuperating zone (7), entering through a first end (11) and exiting at a second end (9). The recuperating zone (7) is initially at a lower temperature than the reforming zone (1). As the synthesis gas passes through the recuperating zone (7), the synthesis gas is cooled to a temperature approaching the temperature of the zone substantially at the second end (9), which is approximately the same temperature as the regeneration feed introduced during the second step of the cycle via conduit (19) (e.g., from about 200° C. to about 650° C. As the synthesis gas is cooled in the recuperating zone (7), a temperature gradient (24) is created and moves across the recuperating zone (7) during this step.

At the point between steps, the temperature gradients have moved substantially across the reforming zone (1) and the recuperating zone (7). The zones are sized so that the gradients move across both in comparable time during the above reforming stage. The recuperating zone (7) is now at the high temperature and the reforming zone (1) is at low temperature, except for the temperature gradient that exists near the exits of the respective zones. The temperature of the reforming zone (1) near the inlet end (3) has now been cooled to a temperature that approaches the temperature of the feed that has been entering via conduit (15) (e.g., from about 200° C. to about 400° C.).

In the practice of pressure swing reforming, there are alternative means for determining the end of the reforming stage. Toward the end of the reforming stage, the temperature at end (5) of the reforming zone is reduced and consequently the reforming performance deteriorates below acceptable conversion efficiencies. Reforming performance, as used herein, refers to the conversion of feed hydrocarbons into synthesis gas components of $H_2$, CO and $CO_2$. The term percent conversion, as used herein, is calculated as the percent conversion of the carbon in feed hydrocarbonaceous species into synthesis gas species of CO and $CO_2$. The term unconverted product hydrocarbons, as used herein, refers to product hydrocarbonaceous species that are not synthesis gas components of $H_2$, CO and $CO_2$. These typically include product methane, as well as feed hydrocarbons and the cracking products of feed hydrocarbons. The reforming stage ends when the reforming performance deteriorates to a level that is below acceptable limits. In practice, optimization of the overall reforming and synthesis gas utilization process will dictate a desired, time-averaged level of reforming conversion. That time-averaged level of reforming conversion is typically greater than 80%, preferably greater than 90%, and most preferably greater than 95%.

The point in time at which the reforming stage is ended, and thus the duration of the reforming stage, may be chosen (a) as a response to the time-varying performance of the reformer during each reforming stage; or (b) based on overall (time-averaged) performance or the system; or (c) fixed as a constant reforming stage duration. In embodiment (a), at least one feature of the operation is monitored that is correlated to the reforming performance. This feature may be a composition such as $CH_4$, $H_2$, or CO, or alternatively a temperature, such as the temperature at the end (5) of the reforming bed. In one embodiment of the present invention, the reforming stage is ended when the temperature at the end (5) of the reforming has decreased to a pre-selected temperature between about 700° C. and about 1200° C. In embodiment (b), the reforming stage duration is adjusted based on a measured feature that reflects the overall (time-averaged) performance or the system. This may be an average product composition such as $CH_4$, $H_2$, or CO. In one embodiment the present invention, the reforming stage duration is adjusted based on the time-averaged concentration of $CH_4$ in the product, using control strategies known in the art to shorten or lengthen the duration to achieve a predetermined target $CH_4$ amount. In a preferred embodiment, the target $CH_4$ amount is set at an amount that represents between about 1% and about 15% of the hydrocarbonaceous feed carbon. In case (c), the reforming stage duration is of fixed length, at a value that is predetermined to be acceptable for the space velocity of the operation. In one embodiment the present invention, the reforming stage duration is fixed at a duration between about 0.1 sec and less than about 60 seconds and preferably between about 1.0 and 30 seconds.

After the synthesis gas is collected via an exit conduit (17) at the second end (9) of the recuperating zone (7), the second step of the cycle, also called the regeneration stage begins. The regeneration stage, illustrated in FIG. 1b, basically involves transferring the heat from the recuperator bed (7) to the reformer bed (1). In so doing, the temperature gradients 25 and 26 move across the beds similar to but in opposite directions to gradients 23 and 24 during reforming. In a preferred embodiment, an oxygen-containing gas and fuel are introduced via a conduit (19) into the second end (9) of the recuperating zone (7). This mixture flows across the recuperating zone (7) and combusts substantially at the interface (13) of the two zones (1) and (7). In the present invention, the combustion occurs at a region proximate to the interface (13) of the recuperation zone (7) and the reforming zone (1). The term, "region proximate", in the present invention, means the region of the PSR beds in which regeneration stage combustion will achieve the following two objectives: (a) the heating of the reforming zone such that end (5) of the reforming zone is at a temperature of at least 800° C., and preferably at least 1000° C. at the end of the regeneration stage; and (b) the cooling of the recuperation zone to a sufficient degree that it can perform its function of accepting synthesis gas sensible heat in the subsequent reforming stage. Depending on specific regeneration embodiments described herein, the region proximate to the interface can include from 0% to about 50% of the volume of the recuperation zone (7), and can include from 0% to about 50% of the volume of the reforming zone (1). In a preferred embodiment of the present invention, greater than 90% of the regeneration stage combustion occurs in a region proximate to the interface, the volume of which region includes less than about 20% the volume of the recuperating zone (7) and less than about 20% the volume of reforming zone (1).

The location of combustion may be fixed by introduction of one of the combustion components, e.g., the fuel, at or substantially at, the interface of the two zones (13), while the other component, e.g., the oxygen-containing gas may be introduced at the first end (9) of the recuperating zone (7). Alternatively, the fuel and oxygen-containing gas (19) streams may be mixed at the open-end (9) of the recuperating zone (7) and travel through the zone and combust at the interface of the zones (13). In this embodiment, the location of combustion is controlled by a combination of temperature, time, fluid dynamics and catalysis. Fuel and oxygen conventionally require a temperature-dependent autoignition time to combust. In one embodiment, the flow of a non-combusting mixture in a first substep of regeneration will set the temperature profile in the recuperating zone (7) such that the zone is not hot enough to ignite until the mixture reaches the interface of the zones.

The presence of catalyst in the reforming zone can also be used to initiate combustion at that location, and a space between the reforming and recuperating zones can be added and designed to further stabilize the combustion process and confine the combustion to the area proximate to the above described interface. In yet another embodiment, the location of combustion is fixed by mechanical design of the recuperating zone. In this design, the fuel and oxygen-containing gas are travelling in separate channels (not shown), which prevent combustion until the feeds combine at the interface of the zones (13). At that location, flame holders (not shown) or a catalyst in the reforming zone will ensure that the combustion occurs.

The combustion of the fuel and oxygen-containing gas creates a hot fluegas that heats the reforming zone (1) as the flue gas travels across that zone. The fluegas then exits through the first end of the reforming zone (3) via a conduit (27). The composition of the oxygen-containing gas/fuel mixture is adjusted to provide the desired temperature of the reforming zone. The composition and hence temperature is adjusted by means of the proportion of combustible to non-combustible portions of the mixture. For example, when the oxygen-containing gas is air, a limited amount of fuel can be provided such that only about 25% to about 50% of the oxygen in the air is combusted. Alternatively, non-combustible gases such as $H_2O$, $CO_2$, and $N_2$ can be added to an air-fuel mixture to reduce combustion temperature. In a preferred embodiment, non-combustible gases are obtained by use of steam, flue gas, or oxygen-depleted air as one component of the mixture. When the hot fluegas reaches the temperature gradient within the reformer, the gradient moves further across the bed. The outlet temperature of the fluegas will be substantially equal to the temperature of the reforming zone (1) near the inlet end (3). At the beginning of the regeneration stage, this outlet temperature will be substantially equal to the inlet temperature of the reforming feed of the preceding, reforming, step. As the regeneration stage proceeds, this outlet temperature will increase slowly and then rapidly as the temperature gradient reaches end (3), and can be 50-500° C. above the temperature of the reforming feed by the end of the stage.

In the practice of pressure swing reforming, there are alternative means for determining the end of the regeneration stage. The regeneration stage ends when sufficient heat has been supplied or conveyed to the reforming bed to enable the carrying out of the reforming stage. The point in time at which the regeneration stage is ended, and thus the duration of the regeneration stage, may be chosen (a) as a response to the time-varying performance of the PSR during each regeneration stage; or (b) based on overall (time-averaged) performance or the system; or (c) fixed as a constant regeneration stage duration. In embodiment (a), some feature of the operation is monitored that is related to the regeneration performance. This feature could be a composition such as $O_2$, $CH_4$, $H_2$, or CO, or could be a temperature such as the temperature at the end (3) of the reforming bed. In one embodiment of the present invention, the regeneration stage is ended when the temperature at the end (3) of the reforming bed has increased to a pre-selected temperature between about 200° C. and about 800° C. In embodiment (b), the regeneration stage duration is adjusted based on a measured feature that reflects the overall (time-averaged) performance of the system. This feature may be an average product composition such as $CH_4$, $H_2$, or CO, or some other system measurement. In one embodiment of the present invention, the regeneration stage duration is adjusted based on the time-averaged concentration of $CH_4$ in the product, using control strategies known in the art to shorten or lengthen the duration to achieve the target $CH_4$ amount. In a preferred embodiment, the target $CH_4$ amount is set at an amount that represents between about 1% and about 15% of the hydrocarbonaceous feed carbon. In embodiment (c), the regeneration stage duration is of fixed length, at a value that is predetermined to be acceptable for the space velocity of the operation. In one embodiment the present invention, the regeneration stage duration is fixed at a duration between about 0.1 second and about 60 seconds and preferably 1.0-30 seconds. In all of these cases, but particularly in embodiment (c), it is preferable to also adjust the regeneration flow rates to increase or decrease the amount of heat added to the bed during the step—in a manner similar to that described with respect to adjustment of duration in embodiment (b), above. In a further embodiment of the present invention, the regeneration stage duration is fixed at a duration between about 1 second and about 60 seconds, and the regeneration flow rate is adjusted over time so that the time-average concentration of $CH_4$ in the reforming product approaches a target $CH_4$ amount that is set at an amount that represents between about 1% and about 15% of the hydrocarbonaceous feed carbon.

The reforming zone is now, once again, at reforming temperatures suitable for catalytic reforming.

In pressure swing reforming the two stages of the cycle are conducted at different pressures, that is, the reforming stage is typically carried out at higher pressures than the regeneration stage. The reforming stage pressures range from about ten (10) atmospheres (absolute pressure) to about one hundred (100) atmospheres. Regeneration stage pressures range from about five atmospheres to about thirty (30) atmospheres. Unless otherwise stated, pressures are identified in units of absolute pressure. The pressure swing is enabled in principle part by the large volumetric heat capacity difference between the solid bed packing material and the gases.

The space velocity of a system is typically expressed on an hourly basis as the standard volumetric gas flow rate of feed divided by the volume of catalyst bed, called gaseous hourly space velocity, or GHSV. Space velocity can also be defined in terms of the hydrocarbon component of feed. As so defined, the GHSV for a methane feed would be the standard hourly volumetric gas flow rate of methane divided by the bed volume. As used herein, the term space velocity, abbreviated as $C_1$GHSV, refers to the space velocity of any hydrocarbon feed placed on a $C_1$ basis. As such, the hydrocarbon feed rate is calculated as a molar rate of carbon feed, and standard volume rate calculated as if carbon is a gaseous species. For example, a gasoline feed having an average carbon number of 7.0 that is flowing at a standard gaseous flow rate of 1,000 NL/hr into a 1.0 L bed would be said to have a space velocity of 7,000. This definition is based on feed flow during the reforming stage and wherein the bed volume includes all catalysts and heat transfer solids in the reforming and recuperating zones.

In pressure swing reforming, the space velocity, $C_1$GSHSV, typically ranges from about 1,000 to about 50,000.

In a preferred embodiment pressure swing reforming is conducted under bed packing and space velocity conditions that provide adequate heat transfer rates, as characterized by a heat transfer parameter, $\Delta T_{HT}$, of between about 0.1° C. to about 500° C., and more preferably between about 0.5° C. and 40° C. The parameter $\Delta T_{HT}$ is the ratio of the bed-average volumetric heat transfer rate that is needed for reforming, H, to the volumetric heat transfer coefficient of the bed, $h_v$. The volumetric heat transfer rate that is needed for reforming is calculated as the product of the space velocity with the heat of reforming (on heat per $C_1$ volume basis). For example, H=4.9 cal/cc/s=2.2 cal/cc*8000 hr$^{-1}$/3600 s/hr, where 2.2 cal/cc is the heat of reforming of methane per standard volume of methane, and 8000 is the $C_1$GHSV of methane. When the duration of reform and regeneration stages are comparable, the value of H will be comparable in the two steps. The volumetric heat transfer coefficient of the bed, $h_v$, is known in the art, and is typically calculated as the product of a area-based coefficient (e.g., cal/cm$^2$s° C.) and a specific surface area for heat transfer ($a_v$, e.g., cm$^2$/cm$^3$), often referred to as the wetted area of the packing.

Bed packing materials suitable for use in the pressure swing reforming process include cordierite, aluminum silicate clays, mullite, silica-alumina, zirconia and the like that are stable to at least 1000° C. Suitable reforming catalysts include noble, transition, and Group VIII components, as well as Ag, Ce, Cu, La, Mo, Mg, Sn, Ti, Y, and Zn, or combinations thereof. Preferred catalyst systems include Ni, NiO, Rh, Pt, and combinations thereof. These materials may be deposited or coated on, or in, catalyst supports well known in the art.

Figure 2:
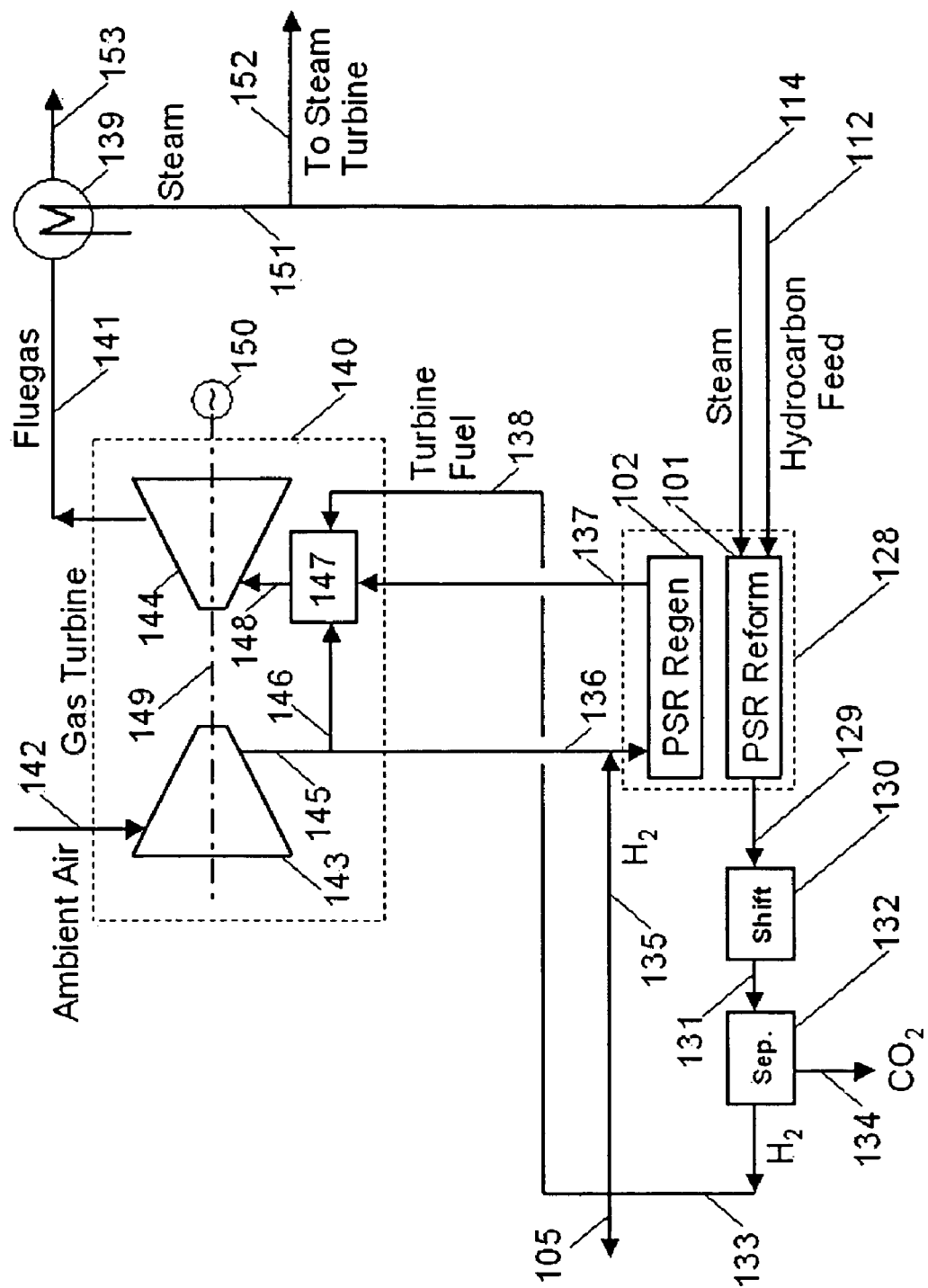
FIGS. 2 and 3 are schematic diagrams illustrating alternate process flow designs according to the invention and in which like reference numerals represent like parts or functions.

Turning to FIG. 2, one embodiment of the present invention will be described with various stages and components referred to in the singular although it should be understood that when necessary or desirable a plurality of stages or components may be employed. Also, to facilitate an understanding of the process flow scheme the pressure swing reformer (128) is shown with process blocks (101) and (102) that represent the reforming and regeneration stages of the pressure swing reforming cycle. As is shown in FIG. 2, a pressure swing reformer (128) is in operable communication with water gas shift reactor(s) (130) and hydrogen separator (132). A hydrocarbon feed (112), e.g., methane, and steam (114) are passed through the pressure swing reformer (128) for conversion therein to synthesis gas. The synthesis gas (129) is fed to the shift reactor(s) (130) where the CO in the synthesis gas is converted to CO$_2$ and additional hydrogen is produced (illustrated supra in equation 2). This hydrogen enriched gas stream is separated from the CO$_2$ in separation zone (132) and at least a portion of the separated hydrogen is used as fuel (138) for gas turbine (140). Optionally a portion of the hydrogen may be used as fuel (135) for the pressure swing regeneration stage (102) and may also be exported as hydrogen product (105).

In a preferred embodiment, the reforming stage is operated at a pressure sufficient to provide hydrogen, after shift and separation, at a high pressure that at least matches the pressure required for use as regeneration and turbine fuel. Typically the reforming cycle is operated at pressures greater than about 10 bar and preferably at pressures in the range of about 10 to 50 bar. Also, the reforming reaction preferably is carried out with sufficient excess of steam to satisfy the needs of the shift reaction. When the reforming stage is executed at high pressure, it may be desirable to include a brief period of inert purge at the end of the reforming stage to sweep remaining product from the void fractions of the bed. In a preferred embodiment, this inert purge is composed predominantly of steam.

Additionally the hydrocarbon (112) and steam (114) feed are passed through the reformer (128) at a space velocity ($C_1$GHSV) in the range of about 1000 to 50,000 hr$^{-1}$, more preferably in the range of about 2000 hr$^{-1}$ to about 25,000 hr$^{-1}$.

In the embodiments herein utilizing pressure swing reforming the bed packing material employed will preferably be in the form of honeycomb monoliths, which have straight channels to minimize pressure drop and enable greater reactor length. Preferred honeycomb monoliths for the present invention will have channel densities that range from about 100 cells/in$^2$ to about 1600 cells/in$^2$ (15-250 cells/cm$^2$). Other, more tortuous packing, such as foam monoliths and packed beds may also be employed. Preferred foam monoliths for the present invention will have pore densities that range from about 10 ppi (pores per inch) to about 100 ppi (4-40 pore/cm). Preferred packed beds for the present invention will have packing with specific surface area that range from about 100 ft$^{-1}$ to about 2000 ft$^{-1}$ (3.3-65 cm$^{-1}$). Preferred reactor design will include a mass of packing material in the recuperator that is about 20% to about 40% of the total mass of packing and catalyst in the reactor (reformer plus recuperator).

As stated, the synthesis gas (129) is fed to the shift step (130) where the CO levels in the synthesis gas (129) are lowered and CO$_2$ and additional hydrogen is produced. The water-gas shift reaction is a process well known in the art. Typically, the process is conducted in one or two stages at temperatures of about 250° C. to about 400° C. in the presence of an iron oxide-chromium oxide catalyst. The shift may also include low-temperature, stage, having inlet temperatures of 150° C. to 250° C. in which the catalyst typically is copper oxide-zinc oxide supported on alumina. The use of a low-temperature shift step (130) can effectively lower the CO concentrations in the product gas mixture and ultimately the separated product hydrogen and CO$_2$. Thus, CO in the hydrogen stream (133) will produce only a minor carbon oxide emission upon combustion in the gas turbine (140) and CO in the CO$_2$ stream (134) will represent only a minor loss of fuel value.

The hydrogen separation step (132) may be any technology that separates hydrogen from CO$_2$. Technologies that may be used in the present invention include adsorption processes, absorption processes, hybrid adsorption-absorption processes, cryogenic processes, pressure- and temperature-swing adsorption processes and membrane separation processes. Absorption processes typically utilize liquid solutions to remove CO$_2$, with the CO$_2$ typically being absorbed into the solution in a contacting section and then recovered in a separate stripping section. Typical solutions include methanol, N-methyl pyrolidone; monoethanol amine (MEA) methyldiethanol amine (MDEA) and potassium carbonate to mention a few. Cryogenic processes are typically distillation processes, but may include $CO_2$ separation by adjusting gas temperature and pressure such that $CO_2$ is removed as a liquid or solid. Adsorption processes remove components from a gas stream based on their preferential attraction to a solid adsorbent. The adsorbed material is recovered by decreasing pressure (pressure swing) increasing temperature (temperature swing) or both. Typical adsorption solids include activated carbon, zeolite molecular sieves, and activated alumina. Membrane processes remove certain species from a fluid by virtue of the more-rapid passage of those species through a barrier membrane layer to a region of lower partial pressure. Active layers for membrane separations as used herein include polymers, carbon, amorphous inorganic materials such as silica, crystalline inorganic materials including zeolites, and metallic layers including palladium and palladium alloys. The separation may also be designed to act on other species in the syngas, for example, absorption may be used to capture impurity $H_2S$ into the captured $CO_2$ stream. Preferred separations can be chosen by individuals skilled in the art based on requirements for purity and pressure in the hydrogen and $CO_2$ streams.

In FIG. 2 no provision for heat exchange or conditioning is shown. Indeed, an advantage of the present invention is that pressure swing reforming syngas effluent (129) conditions can be tuned to require no conditioning prior to introduction into the shift reactor (130). However, it is understood that conditioning as is known in the art may be applied to these streams. For example, heat exchange may be applied to adjust temperatures. The separation step (132) generally requires synthesis gas at conditions different from the exit conditions of the shift step (130).

The reforming inlet stream is composed of hydrocarbon (112) and steam (114). These streams may be preheated to any level that is economically achievable with heat available around the process. Typically, the steam (114) will be available at about the boiling temperature that corresponds to the pressure of reformer operation, typically 200° C. to 300° C. Waste heat is typically available that can heat the reforming feeds to temperatures in the range of 200° C. to 400° C. Increasing the preheat will improve process efficiency at a cost of added heat exchange. This tradeoff is well known in the art, and can be optimized by one skilled in the art for any given situation of capital and energy cost. The incoming reforming feed temperature sets a lower limit on the temperature of the outgoing fluegas (137). However, the temperature of the outgoing fluegas is also strongly influenced by the temperature that remains in the reforming section of the bed (1) at the end of the reforming stage. That remaining temperature is strongly influenced by the kinetics of reforming, the pressure, and space velocity. Under the conditions described herein, the flue gas (137) will be at temperatures in the range of about 400° C. to about 600° C.

The regeneration stage (102) of the pressure swing reformer (128) is carried out by introducing hydrogen-containing gas (135) and an oxygen containing gas (136), e.g., air, into the reformer (128) for combustion therein. The oxygen-containing gas (136) used for regeneration is obtained as air that is extracted from a gas turbine (140).

As stated previously, at least a portion of the separated hydrogen (133) is provided as fuel (138) for combustion in a gas turbine. A typical gas turbine is diagrammatically shown in FIGS. 2 and 3 as comprising a compressor (143) and gas expander (also sometimes referred to as a turbine) (144) on a common shaft (149), and a combustor (147). Ambient air (142) is compressed in the compressor (143) whereupon it flows as hot compressed air (146) into a combustion step (147) in which fuel (138) is burned to create a very hot, high pressure fluegas (148) that is expanded in gas expander (144) to an ambient-pressure fluegas (141). It is understood that the combustor step typically divides the air into an "oxidant" fraction that is used in combustion and a "diluent" fraction that is used cool the combustor and combustion products to acceptable turbine-inlet temperature. The expander (144) releases more power to shaft (149) than is required by the compressor (143), and the remaining power is converted by generator (150) into electricity, or used as mechanical work, for example to drive other compressors. In a combined cycle gas turbine system, the ambient-pressure fluegas (141) is further cooled in a steam generating system (139) to yield pressurized steam (151) and cooled fluegas (153). The steam (151) product in then expanded in a steam turbine to produce additional power. It is known in the art that a fraction of the hot compressed air (145) can be removed from the gas turbine and used in an external process, without upsetting the gas turbine operation. Typically, when air is extracted, replacement gas is supplied to the expander (144) to preserve the power output of the gas turbine.

In the present invention, the oxygen-containing gas (136) used for regeneration (102) is obtained as air that is taken as a fraction of the hot compressed air (145) that has been compressed in the gas turbine (140). The remaining hot compressed air (146) is sent to the combustor (147). Fluegas (137) from the pressure swing reforming regeneration stage (102) is returned to the gas turbine combustor step as oxidant and/or diluent.

When the regeneration stage (102) of pressure swing reforming is coupled to a gas turbine, as described in FIG. 2, the temperature and pressure of the regeneration feed (136) take on the characteristics of the gas turbine's hot compressed air (145). Typically the regeneration feed will be at a temperature in the range of about 200° C. to 650° C. and preferably at 300° C. to 500° C. The regeneration stage will be operated at pressures in the range of about 5 to about 30 bar, and preferably in the range of about 10 to about 20 bar.

Figure 3:
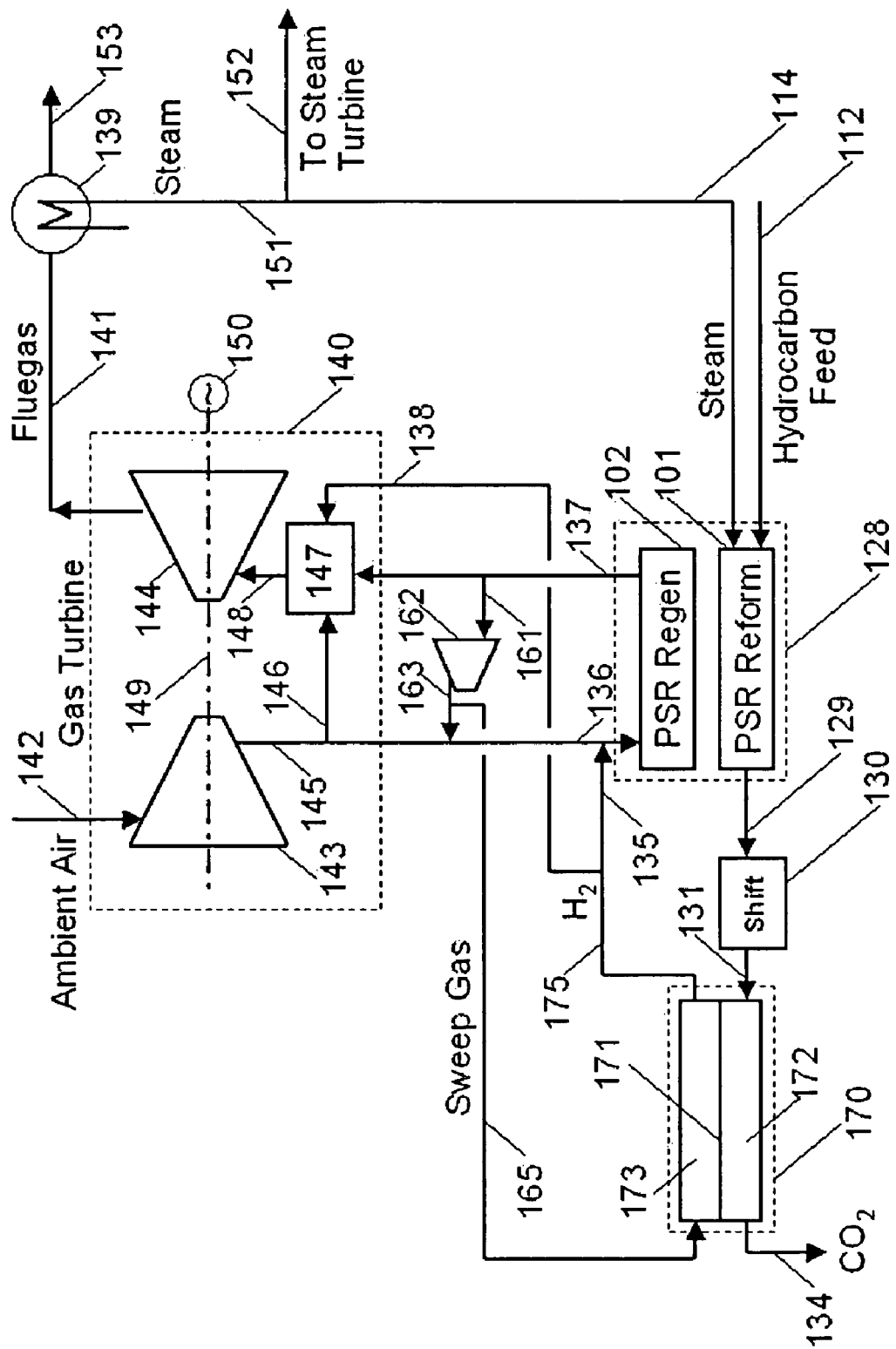

Additional embodiments of the invention are shown. In one of these embodiments, some of the fluegas (137) from the regeneration stage (102) is recycled back to the regeneration inlet (136). In this embodiment shown in FIG. 3 a portion (161) of the flue gas (137) is diverted to a blower (162) that boosts the pressure to produce a higher-pressure stream (163) that is combined with the air extracted from the gas turbine to provide the oxygen-containing stream (136) for regeneration. The use of fluegas recycle reduces the amount of air that must be extracted from the gas turbine to operate the pressure swing reforming by providing recycled fluegas to control combustion temperature instead of provided excess air. As with FIG. 2 no provision for heat exchange or conditioning is shown in FIG. 3; however conditioning may be applied if desired. For example, fluegas that is diverted for recycle (161) may be cooled in a steam boiler, as is known in the art, to reduce the volume flow rate and power requirement in the blower. Such cooling may be used to raise steam that can be used as feed to reform step (114). In one preferred fluegas recycle embodiment, the relative amount of extraction air and recycled fluegas (163) is set so that the molar flow of oxygen in the oxygen-containing gas (136) is exactly the amount needed to fully combust the regeneration fuel (135). In this embodiment, all the oxygen and fuel are consumed in the regeneration stage (102), and the fluegas (137) is essentially oxygen-free and fuel-free.

In another embodiment shown in FIG. 3, a recycled fluegas stream that is oxygen-free and fuel-free is used as sweep gas for a membrane separation. In this embodiment, the separation step (170) is a membrane separator, comprised of membrane (171), channels (172) that carry feed and retentate, and channels (173) that carry sweep and permeate. The membrane (171) is preferably highly permeable to hydrogen and substantially impermeable to CO2. In this embodiment, fluegas recycle is used in a manner that results in an essentially oxygen-free and fuel-free recycle stream, as described above. A fraction (165) of this recycle stream is diverted for use as a sweep gas in the membrane separator (170). The membrane module is configured in generally counter-current arrangement, so that the retentate product (134) is across the membrane from the sweep feed (165) and the permeate product (175) is across the membrane from the syngas feed (131). By use of a sweep gas, and by configuring the membrane for counter-current operation, the hydrogen content of the product $CO_2$-containing stream (134) can be driven to near-zero concentrations. Such membrane configurations are known in the art, but normally suffer from the disadvantage that the permeated material (in this case, hydrogen) is diluted with sweep gas in the permeate product stream (175). However, in the present invention, the permeated hydrogen fuel is destined to be combusted in the presence of this same fluegas diluent, either in the pressure swing reformer regenerator or in the gas turbine. Thus it is not a disadvantage for the hydrogen to be diluted in the fluegas that is used as sweep. The advantage of this embodiment is that both separated streams are recovered at high pressure. The $CO_2$ (134) is recovered at the pressure of the reformer, and the hydrogen fuel is recovered in a stream (175) that is at appropriate pressure for use as regeneration fuel (135) and gas turbine fuel (138).

In a preferred embodiment, the membrane is based on a metal layer as the active agent of separation. Metal layers are advantageous because of their high selectivity to permeate only hydrogen. In the present invention, metal layers are also advantageous because metal-based membranes typically operate at temperatures in the range of 200 to 500° C. which temperatures require little adjustment from the exit temperatures of the shift step(s) (130) or of the sweep gases (165). In a further preferred embodiment, the metal layer is based on palladium or alloys of palladium. In a further preferred embodiment, the membrane module includes catalytic activity for the water gas shift reaction, to further convert CO to $CO_2$ and $H_2$ as the shift equilibrium limit is removed due permeation of hydrogen through the membrane.

An important aspect of the invention is that the hydrogen produced is used as a fuel for combustion with compressed air to power a gas turbine. As shown in FIG. 2, at least a fraction of the regeneration flue gas (137) is utilized with the produced hydrogen (138) and compressed air (139) to power gas turbine (140). The turbine flue gas (141) is used to generate steam (114) for use in the reforming stage.

As will be appreciated one among other advantages of the present invention is that it is operable under conditions in which only minor amounts of $CO_2$ are emitted from the combustion zone of the gas turbine and that substantially the only $CO_2$ produced is that contained in the gas obtained after the water gas shift reaction.

As described in connection with FIG. 2, the pressure swing reformer may be sized relative to the gas turbine to provide sufficient hydrogen to power the gas turbine. The net effect is that power is generated under conditions that facilitate $CO_2$ capture thereby avoiding substantial release of $CO_2$ into the atmosphere. Also, as described in connection with FIG. 2, the pressure swing reformer may be sized relative to the gas turbine to provide sufficient hydrogen not only to power the turbine but for other uses.

The separated $CO_2$ represents captured $CO_2$ from the power generation. It may be sequestered, suitably disposed of to mitigate climate impact, or it may be used for other purposes, including, for example, use for enhanced oil recovery, for chemical feedstock, as inerting agent, refrigerant, aerosol propellant, or for beverage carbonation.

Example 1

To further illustrate the invention key streams of the calculated heat and material balance for the embodiment shown in FIG. 2 is given in Table 1. This pressure swing reformer system is operated as two cylindrical reactors, with internal dimensions of 11 ft (3.4M) diameter and 4 ft (1.2M) length. The reactors are positioned with cylindrical axis in a vertical orientation, and reforming is carried out as up-flow; regeneration as down-flow. The packing is composed of 400 cell/$in^2$ (62 cell/$cm^2$) honeycomb monolith having a bulk density of 50 lb/$ft^3$ (0.8 g/cc). The bottom 70% of the packing includes reforming catalyst. Overall cycle length is 30 seconds; 15 s for the regeneration stage and 15 seconds for the reforming stage. A brief steam purge is included at the end of the reforming stage.

The reforming stage (101) is fed with methane (112) at the rate of 1760 kgmoles/hr, accompanied by steam (114) at a rate of 4494 kgmoles/hr, representing a reforming C1GHSV of 3,600 $hr^{-1}$. Syngas (129) is produced at rates shown in Table 1, and converted in high and low temperature shift stages (130) to yield shifted product (131). Separation is accomplished by absorption using an activated MDEA solvent system, yielding 1648 kgmoles/hr of $CO_2$ in purified stream (134) and hydrogen rich fuel stream (133) shown in Table 1.

The regeneration stage (102) of the pressure swing reformer is coupled with a gas turbine whose normal operation comprises air compression to 12.6 atm. abs. and 384° C.; a heat rate of 10,100 BTU/kWh (10655 kJ/kWh); 921 lb/sec (418 kg/s) turbine flow; and 126 MW net power output. The integration with the pressure swing reformer is made on a basis of constant gas turbine net power output (126 MW), which coincidentally reflects constant gas volume flow rate into the turbine expander (144).

In the example of Table 1, 42% of the turbine compressor air is extracted for use in PSR regen. 26% of the hydrogen rich fuel (133) is used for regeneration (135) in the reformer, while the remainder is used as turbine fuel (138). Flow rates for PSR regeneration effluent (137) and post-combustor turbine inlet stream (148) are shown in Table 1. The pressure swing reformer of FIG. 2 and Table 1 is operating at an efficiency of about 96%, meaning that the heat of combustion (ΔHc) of the syngas product (129) is 96% of the ΔHc of the combined reform feed (112) and regen fuel (135).

In this power producing system, fuel is fed to the PSR instead of the Gas Turbine. Net gas turbine power of 126 MW is achieved using a fuel (to PSR) flow rate 5% above the rate that would have been used in the standalone Gas Turbine without CO2 capture. A fuel penalty is expected due reforming inefficiency and due to the removal of CO2 from the turbine and the loss of work that could have been performed by that CO2. A penalty as low as 5% is exceptional. The overall operation captures 94% of the fuel CO2 in a concentrated stream (134).

TABLE 1

(FH338; PSR at 3600 hr$^{-1}$ C1GHSV)

| Stream # on FIG. 2 | | 129 | 131 | 133 | 145 | 136 | 137 | 148 |
|---|---|---|---|---|---|---|---|---|
| | Temperature, ° C. | 401 | 200 | 65 | 384 | 384 | 427 | 1060 |
| | Pressure, atm abs | 16 | 15.5 | 15 | 12.6 | 12.4 | 12.2 | 11.9 |
| | stream name | Reformate | Shifted | H2 product | Comp. Air | PSR Air | PSR Flue | Turb-Inlet |
| Kgmols/hr | H2O | 2,189 | 804 | 123 | 0 | 0 | 2,096 | 7,348 |
| | O2 | 0 | 0 | 0 | 10,766 | 4,522 | 3,593 | 7,251 |
| | N2 | 171 | 171 | 171 | 40,499 | 17,010 | 16,839 | 40,499 |
| | CO2 | 263 | 1,648 | 0 | 0 | 0 | 28 | 108 |
| | CH4 | 35 | 35 | 35 | 0 | 0 | 0 | 0 |
| | CO | 1,458 | 73 | 73 | 0 | 0 | 0 | 0 |
| | H2 | 5,456 | 6,842 | 6,838 | 0 | 0 | 0 | 0 |
| | Total | 9,572 | 9,572 | 7,241 | 51,264 | 21,531 | 22,555 | 55,206 |

Example 2

To further illustrate the invention, key streams of a calculated heat and material balance for the embodiment shown in FIG. 2 is given in Table 2. In this example, the pressure swing reformer operated at lower reforming efficiency by increasing the reforming space velocity and increasing regeneration flow rate relative to reform. Increasing space velocity at constant cycle time has the effect of increasing the amount of heat that is stored in the bed in each cycle. This results in a reform-bed temperature profile (26 of FIG. 1b) that must be closer to the bed outlet (3 of FIG. 1b) at the end of regeneration, and consequently a higher fluegas outlet (137) temperature. The increase in regeneration rate has the effect of driving the temperature profile (26 of FIG. 1b) even farther across the bed, resulting in yet higher regeneration fluegas (137) temperature. The reformer is less efficient because more of the heat value of the regeneration fuel (135) is expended to heat the fluegas (137), and thus a smaller fraction is used to make synthesis gas. However, the higher overall bed temperatures result in slight increase in reforming conversion (from 98 to 99%).

This pressure swing reformer system is operated as two cylindrical reactors, with internal dimensions of 10 ft (3 M) diameter and 4 ft (1.2M) length. The reactor configuration, packing and cycle are the same as described with respect to Example 1.

The reforming stage (101) is fed with methane (112) at the rate of 1760 kgmoles/hr, accompanied by steam (114) at a rate of 4494 kgmoles/hr, representing a reforming C1GHSV of 4,650 h$^{-1}$. Syngas (129) is produced at rates shown in Table 2, and converted in high and low temperature shift stages (130) to yield shifted product (131). Separation is accomplished by absorption using an activated MDEA solvent system, yielding 1663 kgmoles/hr of CO2 in purified stream (134) and hydrogen rich fuel stream (133) shown in Table 2.

The regeneration stage (102) of the pressure swing reformer is coupled with the same gas turbine described in respect to Example 1. The integration with the pressure swing reformer is made on the same basis of constant gas turbine net power output (126 MW).

In the example of Table 2, 54% of the turbine compressor air is extracted for use in PSR regen. 33% of the hydrogen rich fuel (133) is used for regeneration (135) in the reformer, while the remainder is used as turbine fuel (138). Flow rates for PSR regeneration effluent (137) and post-combustor turbine inlet stream (148) are shown in Table 2. The pressure swing reformer of FIG. 2 and Table 2 is operating at an efficiency of about 90% meaning more regeneration fuel in used in the reformer (than in example 1). However, the reformer's inefficiency is all captured as increased air preheat for the gas turbine, and thus is not lost to the system. Net gas turbine power of 126 MW is achieved using a fuel flow rate 5% above the rate that is used in the standalone Gas Turbine without CO2 capture, same as example 1. The overall operation captures about 95% of the fuel CO2 in a concentrated stream (134). This example demonstrates that the pressure swing reformer may be operated at a range of conditions and efficiencies within this process without substantial negative impact on process efficiency or CO2 recovery.

TABLE 2

(FH337; PSR at 4650 hr$^{-1}$ C1GHSV)

| Stream # on FIG. 2 | | 129 | 131 | 133 | 145 | 136 | 137 | 148 |
|---|---|---|---|---|---|---|---|---|
| | Temperature, ° C. | 404 | 200 | 65 | 384 | 384 | 538 | 1060 |
| | Pressure, atm abs | 16 | 15.5 | 15 | 12.6 | 12.4 | 12.2 | 11.9 |
| | Stream name | Reformate | shifted | H2 product | Comp. Air | PSR Air | PSR Flue | Turb-Inlet |
| Kgmols/hr | H2O | 2,230 | 839 | 124 | 0 | 0 | 2,508 | 7,312 |
| | O2 | | | | 10,766 | 5,842 | 4,675 | 7,246 |
| | N2 | 131 | 131 | 131 | 40,499 | 21,976 | 21,845 | 40,499 |
| | CO2 | 272 | 1,664 | 0 | 0 | 0 | 30 | 92 |
| | CH4 | 19 | 19 | 19 | | | | |
| | CO | 1,465 | 73 | 73 | | | | |
| | H2 | 5,519 | 6,911 | 6,908 | | | | |
| | Total | 9,637 | 9,637 | 7,255 | 51,264 | 27,818 | 29,057 | 55,149 |

Example 3

To further illustrate the invention, key streams of a calculated heat and material balance for the embodiment shown in FIG. 3 is given in Table 3. In this example, the pressure swing reformer operated as two cylindrical reactors, with internal dimensions of 11 ft (3.4M) diameter and 4 ft (1.2M) length. The reactor configuration, packing and cycle are the same as described with respect to Example 1.

The reforming stage (101) is fed with methane (112) at the rate of 1838 kgmoles/hr, accompanied by steam (114) at a rate of 4693 kgmoles/hr, representing a reforming C1GHSV of 3,600 $hr^{-1}$. Syngas (129) is produced at rates shown in Table 3, is cooled to 280° C. by heat exchange to produce steam, and is converted in an adiabatic, high temperature shift reactor (130) to yield shifted product (131). Separation is accomplished using a high-temperature, palladium-based membrane system (170) operating at about 385° C. with internal water gas shift activity. Compositions, flows and conditions of the sweep stream (165), permeate hydrogen fuel (175) and retentate CO2 stream (134) are shown in Table 3.

The regeneration stage (102) of the pressure swing reformer is coupled with the same gas turbine described with respect to Example 1, and compressor air stream (145) is the same as in Tables 1 and 2. The integration with the pressure swing reformer is made on the same basis of constant gas turbine net power output (126 MW). In the example of Table 3, a fraction of the PSR regeneration product (137) is recycled to regeneration feed, thus reducing the oxygen content of the regeneration product (137) to nearly zero. One consequence of this recycle is that a smaller amount of air must be extracted from the gas turbine. In this example, 9% of the turbine compressor air is extracted for use in PSR regen. Only 7% of the regeneration product (137) is returned directly to the gas turbine, the remainder (161) is cooled to about 375° C. (by raising steam) and then increased to about 13 atm abs pressure in blower (162). Flow rates for PSR regeneration oxidant (136), effluent (137) and post-combustor turbine inlet stream (148) are shown in Table 3.

In the example of Table 3, 28% of the hydrogen-rich permeate stream (175) is used for regeneration (135) in the reformer, while the remainder is used as turbine fuel (138). The pressure swing reformer of FIG. 3 and Table 3 is operating at an efficiency of about 95%. Net gas turbine power of 126 MW is achieved using a fuel flow rate 10% above the rate that is used in the standalone Gas Turbine without CO2 capture. The overall operation captures >99.9% of the fuel CO2 in concentrated stream (134).

This example achieves higher CO2 capture rates but has a higher fuel penalty than examples 1 and 2. Both features occur because the membrane leaves residual and unconverted fuel (H2, CH4 and CO) in the CO2 stream, while the solvent absorption separation leaves this fuel (and its carbon content) in the hydrogen-rich fuel. The fuel value of the retentate stream can be recovered by combusting this stream with purified oxygen, and then heat-exchanging to make steam. Roughly half of the steam requirement of reforming can be generated this way. After combustion and cooling, the retentate comprises 1834 kgmoles/hr of CO2 and 152 kgmoles/hr of nitrogen. If higher-purity CO2 is required, the nitrogen can be reduced to near zero by including a steam purge step in the PSR sequence, in between regeneration and reforming.

TABLE 3

(FH339; PSR at 3600 $hr^{-1}$ C1GHSV, with EGR)

| Stream # on FIG. 3 | | 129 | 134 | 165 | 175 | 136 | 137 | 148 |
|---|---|---|---|---|---|---|---|---|
| | Temperature, ° C. | 399 | 350 | 384 | 384 | 384 | 444 | 1060 |
| | Pressure, atm abs | 20 | 19 | 13 | 12.5 | 12.4 | 12.2 | 11.9 |
| | Stream name | Reformate | retentate | sweep | Sweep + H2 | PSR Ox | PSR Flue | Turb-Inlet |
| Kgmols/hr | H2O | 2,245 | 800 | 2,142 | 2,143 | 5,389 | 8,308 | 7,451 |
| | O2 | 0 | 0 | 1 | 0 | 986 | 5 | 7,226 |
| | N2 | 152 | 152 | 3,861 | 3,861 | 14,040 | 14,959 | 40,347 |
| | CO2 | 275 | 1,720 | | 0 | | 0 | 0 |
| | CH4 | 37 | 37 | | 0 | | 0 | 0 |
| | CO | 1,522 | 77 | | 0 | | 0 | 0 |
| | H2 | 5,714 | 65 | | 7,095 | | 1 | 0 |
| | Total | 9,946 | 2,851 | 6,004 | 13,099 | 20,415 | 23,273 | 55,023 |

What is claimed is:

1. A method for producing power under conditions that facilitate $CO_2$ capture, said method comprising:

(a) producing a synthesis gas by a pressure swing reforming process comprising a reforming stage and a regeneration stage, said reforming stage method comprising:

(i) passing a feed stream under high pressure conditions and comprising a hydrocarbon and steam through a first end of a first, reforming zone containing packing materials and a steam reforming catalyst at an elevated temperature to produce a high pressure synthesis gas stream ranging in pressure from about ten (10) atmospheres to about one hundred (100) atmospheres;

(ii) passing substantially all the synthesis gas stream of step (a) through the first end of a second, recuperating zone, containing bed packing materials at a temperature lower than the first zone, thereby transferring sensible heat from the synthesis gas stream to the packing material in the second, recuperating zone, and providing a high pressure synthesis gas cooled to a temperature of about the packing material at the second end;

said steps (i) and (ii) being conducted at conditions sufficient to provide a synthesis gas at said second end of said second zone in the range of about 200° C. to about 650° C. said conditions comprising: combined reforming and regenerative cooling steps (i) and (ii) are done at a reforming space velocity $C_1$GHSV greater than about 1000 $hr^{-1}$ calculated using a combined volume of both the first and second zones and, bed packing providing a heat transfer parameter $\Delta T_{HT}$ between about 0.1°

C. and about 500°, to produce a time-averaged level of reforming conversion of greater than about 80%;
(iii) removing substantially all of the high pressure synthesis gas from the second zone;

And regeneration stage method comprising:
(iv) introducing a oxygen containing gas into the second end of the second zone, in reverse flow to steps (i) and (ii), combusting said gas and a regenerative fuel at about an interface between the recuperating zone and the reforming zone to re-heat the packing material of the first, reforming zone sufficient for the synthesis gas production of step (i);
(v) removing a regeneratively cooled flue gas from the first end of the first zone;

(b) Enriching and separating hydrogen from the synthesis gas by a process comprising:
(i) introducing said synthesis gas into a water-gas shift reaction zone to provide a shifted gas stream enriched in $CO_2$ and enriched in hydrogen;
(ii) passing the shifted gas stream through a hydrogen separation zone to separate high pressure hydrogen from CO2;
(iii) removing the high pressure hydrogen-containing gas stream from the separation zone;
(iv) removing the CO2 containing gas stream from the separation zone; and (c) introducing at least part of the separated hydrogen as fuel to a combustion zone of a gas turbine together with an oxidant to produce power whereby substantially the only $CO_2$ produced is that contained in the $CO_2$ containing gas stream from the separation zone thereby producing power under conditions that facilitate $CO_2$ capture.

2. The method of claim 1 wherein the fuel of step (a)(iv) is a portion of the high pressure hydrogen-containing gas stream removed from the separation zone and wherein the regeneration stage is conducted at a lower pressure than the reforming stage.

3. The method of claim 2 wherein the amount of feed in step (a) is sufficient to produce sufficient hydrogen for step (a-iv) and (c).

4. The method of claim 2 wherein the amount of feed in step (a) is in excess of that needed to produce sufficient hydrogen for step (a-iv) and (c) whereby power and hydrogen are produced.

5. The method of claim 2 wherein steps (b)(ii) through (b)(iv) are conducted in a membrane separator in which a portion of the flue gas from step (a)(v) is fed to the separator as a sweep gas.

6. The method of claim 1 wherein the separation comprises use of a solvent-based system to absorb $CO_2$ from the hydrogen enriched stream.

7. The method of claim 1 wherein the separation comprises use of solid adsorbents to adsorb $CO_2$ from the hydrogen enriched stream.

8. The method of claim 1 wherein at least step (a) is conducted at a space velocity ranging from about 1,000 to about 50,000.

9. The method of claim 1 wherein the regeneration stage method is conducted at pressures ranging from about five atmospheres to about thirty atmospheres.

* * * * *